(12) United States Patent
Honda et al.

(10) Patent No.: US 8,321,882 B2
(45) Date of Patent: Nov. 27, 2012

(54) DISK DEVICE

(75) Inventors: Kazuyuki Honda, Kanagawa (JP); Tetsuya Okubo, Kanagawa (JP); Kenji Urushihara, Ishikawa (JP); Yoshikazu Ohmura, Ishikawa (JP); Tomomi Nishikata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/059,099

(22) PCT Filed: Dec. 18, 2009

(86) PCT No.: PCT/JP2009/007018
§ 371 (c)(1),
(2), (4) Date: Feb. 15, 2011

(87) PCT Pub. No.: WO2010/070923
PCT Pub. Date: Jun. 24, 2010

(65) Prior Publication Data
US 2011/0265107 A1    Oct. 27, 2011

(30) Foreign Application Priority Data

Dec. 18, 2008  (JP) ................................ 2008-322151

(51) Int. Cl.
*G11B 19/20*    (2006.01)
(52) U.S. Cl. ...................................................... 720/675
(58) Field of Classification Search .................. None
See application file for complete search history.

(56) References Cited

U.S. PATENT DOCUMENTS

| | | | | |
|---|---|---|---|---|
| 6,005,836 A | * | 12/1999 | Choi | 720/697 |
| 6,633,532 B1 | * | 10/2003 | Handa | 720/675 |
| 6,901,599 B2 | * | 5/2005 | Nagatsuka | 720/675 |
| 7,013,472 B2 | * | 3/2006 | Toyama et al. | 720/651 |

(Continued)

FOREIGN PATENT DOCUMENTS

JP    10-208372 A    8/1998
(Continued)

OTHER PUBLICATIONS

International Search Report for PCT/JP2009/007018 dated Feb. 2, 2010.

*Primary Examiner* — Mark Blouin
(74) *Attorney, Agent, or Firm* — Pearne & Gordon LLP

(57) ABSTRACT

A disk device configured in such a manner that, in addition to tilt adjustment, the adjustment of the distance between a disk and an optical pickup can be easily performed. The disk device is provided with a stepping motor (23) for moving the optical pickup (5), a base chassis (2) to which a spindle motor (3) for rotating a turntable on which a disk (1) is affixed is mounted so as to be adjustable in position, a guide shaft (6) provided to the base chassis (2) so as to extend in the radial direction of the disk and guiding the movement of the optical pickup (5) by being in contact with a portion of the optical pickup (5), a sub guide shaft (7) provided to the base chassis (2) and guiding the movement of the optical pickup (5), a tilt adjusting section (300) for adjusting the relative distance between the sub guide shaft (7) and the base chassis (2), and a turntable adjusting section (200) for adjusting the radial angle, the tangential angle, and the height of the spindle motor (3) relative to the base chassis (2).

4 Claims, 18 Drawing Sheets

U.S. PATENT DOCUMENTS

| | | | |
|---|---|---|---|
| 7,213,251 B2 * | 5/2007 | Park et al | 720/675 |
| 7,350,221 B2 * | 3/2008 | Toyama et al. | 720/674 |
| 2004/0071073 A1 * | 4/2004 | Toyama et al. | 369/244 |
| 2005/0125817 A1 * | 6/2005 | Ohno | 720/675 |
| 2006/0123438 A1 * | 6/2006 | Toyama et al. | 720/674 |
| 2010/0299685 A1 * | 11/2010 | Urushihara et al. | 720/703 |

FOREIGN PATENT DOCUMENTS

| | | |
|---|---|---|
| JP | 2005-063549 A | 3/2005 |
| JP | 2007-184056 A | 7/2007 |

* cited by examiner

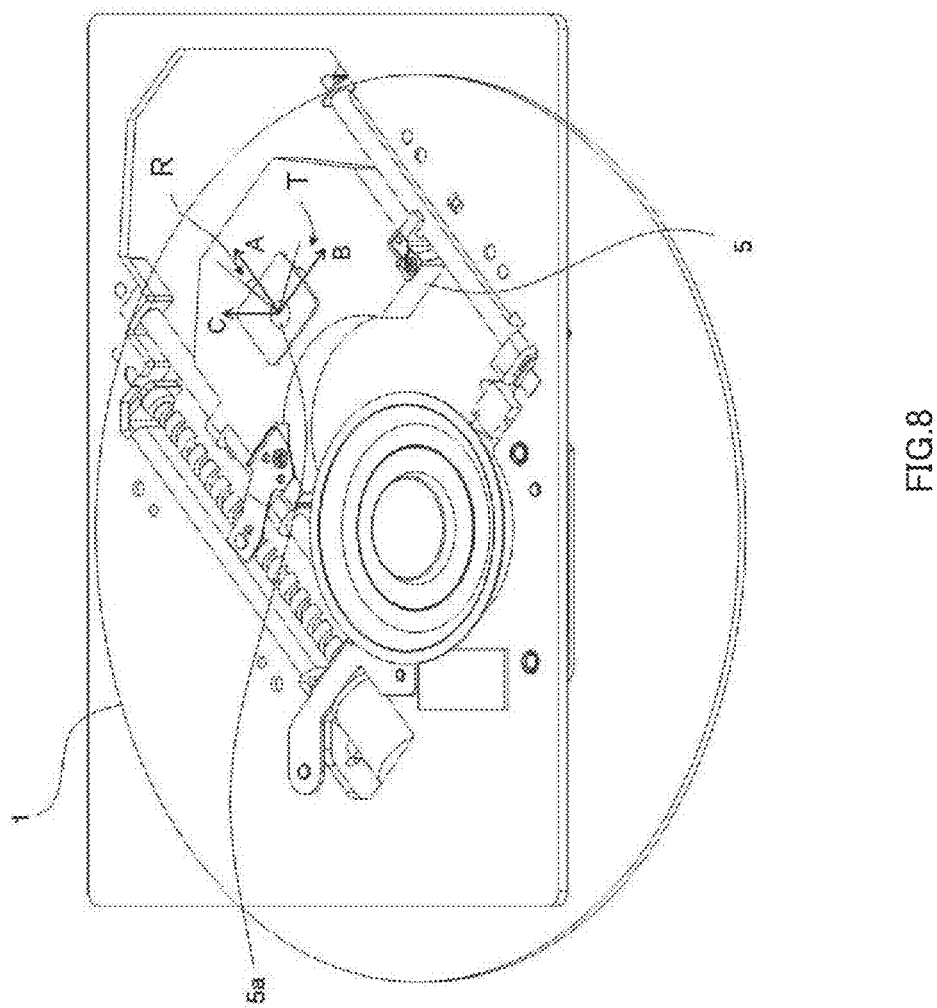

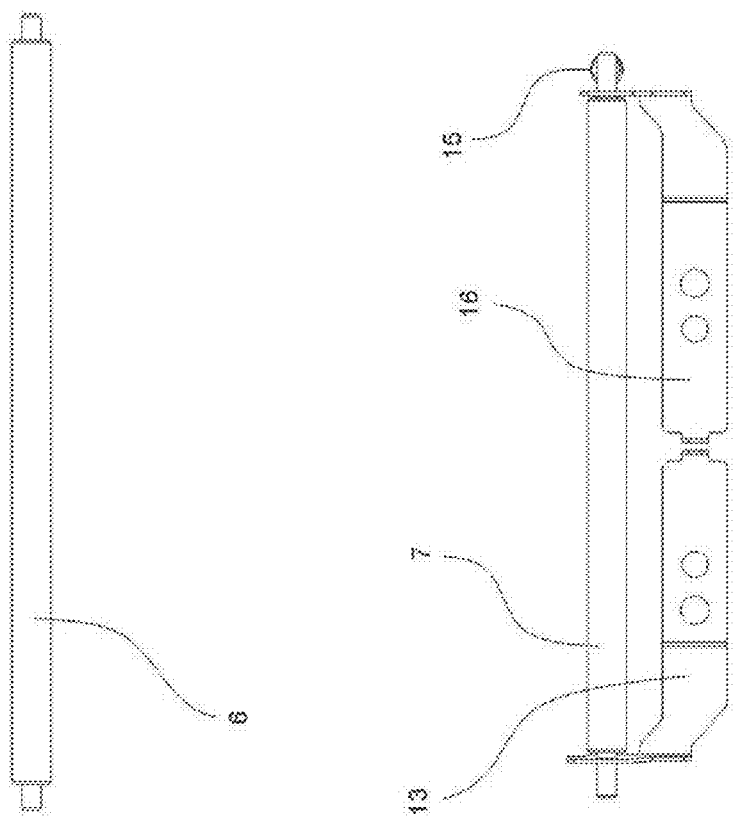

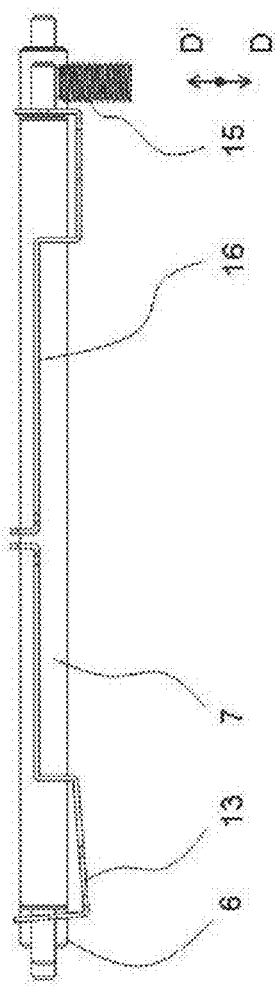
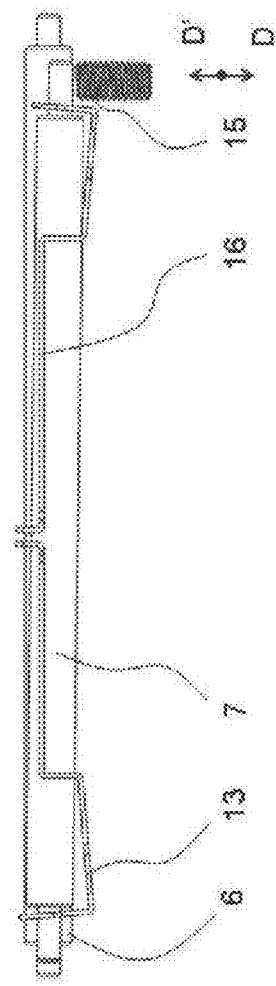
FIG.10A
FIG.10B

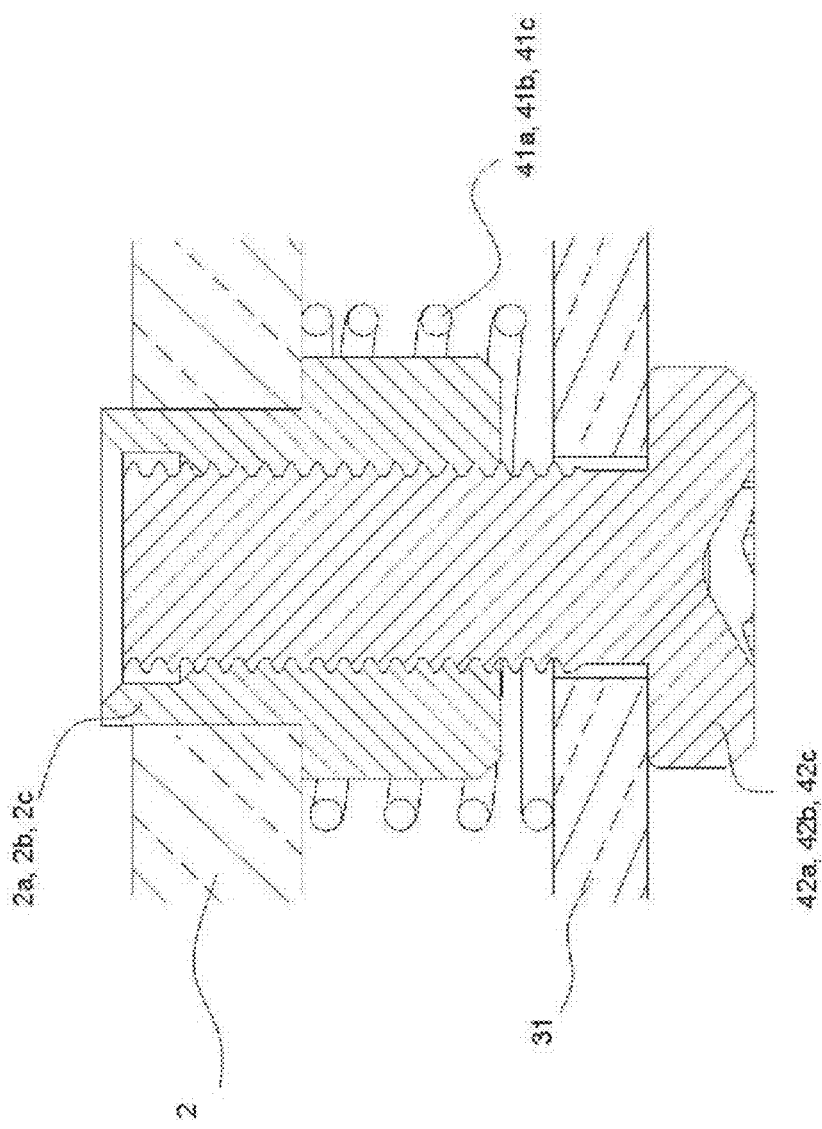

DISK DEVICE

TECHNICAL FIELD

The present invention relates to a disk apparatus that performs playback and recording of a disk on which information has been recorded. More particularly, the present invention relates to a disk apparatus having an adjustment section that adjusts the tilt and height of a turntable on which a disk is mounted, and the tilt of a guide shaft supporting an optical pickup.

BACKGROUND ART

As a conventional disk apparatus, there is an apparatus provided with a radial adjustment section and a tangential adjustment section on a base unit chassis of a stator base of a spindle motor, with the object of making possible high-precision skew adjustment by means of a simple configuration.

Skew adjustment in this conventional apparatus is performed in the following way (see Patent Literature 1, for example). First, an optical pickup is moved to the skew adjustment fulcrum side of a pickup sub guide shaft. Then radial-direction and tangential-direction skew adjustment is performed by the radial adjustment section and tangential adjustment section so as to optimize the value of jitter and the like. Next, the optical pickup is moved to the skew adjustment section side of the pickup sub guide shaft. Then tangential-direction skew adjustment is performed by the pickup sub guide shaft adjustment section so as to optimize the value of jitter and the like.

Here, the radial direction is the direction of the normal to a signal track of the disk in the relationship between the optical pickup and disk signal surface, and the tangential direction is the direction of the tangent to a signal track of the disk. Also, the difference in the tangential angle when the optical pickup is positioned at the inner periphery and when the optical pickup is positioned at the outer periphery is referred to below as residual tangential tilt.

That is to say, with a conventional apparatus, it is possible to perform tilt adjustment in two directions—the radial direction and tangential direction—so that the disk signal surface and the optical axis of the optical pickup are orthogonal, and it is also possible to adjust residual tangential tilt.

Citation List
Patent Literature
PTL 1
Japanese Patent Application Laid-Open No. 2005-63549

SUMMARY OF INVENTION

Technical Problem

However, a problem with a conventional disk drive apparatus and a skew adjustment method thereof is that the distance between a disk and an optical pickup cannot be adjusted.

It is therefore an object of the present invention to provide a disk apparatus that enables the distance between a disk and an optical pickup to be adjusted easily, in addition to performing tilt adjustment in the conventional manner.

Solution to Problem

A disk apparatus of the present invention is provided with: a turntable on which a disk is mounted; a spindle motor that has a rotating shaft fixed to the turntable and that rotates the turntable; an optical pickup that reads a signal recorded on the disk rotated by the spindle motor; a drive motor that moves the optical pickup; a base chassis on which the spindle motor is installed so as to be adjustable in position; a guide shaft that is provided on the base chassis so as to extend in the radial direction of a disk mounted on the turntable, and that guides the movement of the optical pickup by being in contact with part of the optical pickup; a sub guide shaft that is provided on the base chassis and guides the movement of the optical pickup; a tilt adjustment section that adjusts the relative distance between the sub guide shaft and the base chassis; and a turntable adjustment section that adjusts the radial angle, tangential angle, and height of the spindle motor relative to the base chassis.

By means of this configuration, a disk apparatus of the present invention enables accurate adjustment of the radial angle, tangential angle, and height of the spindle motor relative to the base chassis. Furthermore, a disk apparatus of the present invention enables adjustment of the height of the outer periphery side end of the sub guide shaft and adjustment of the guide shaft and sub guide shaft so as to be parallel. By this means, adjustment of the distance between a disk and the optical pickup is made possible for a disk apparatus of the present invention, at the same time as tilt adjustment is made possible, without any particular increase in parts precision. As a result, it can be made possible for a disk apparatus of the present invention to achieve stable disk playback performance and to perform stable focusing with no collisions between a disk and an object lens, without any particular increase in parts precision.

Also, in a disk apparatus of the present invention, the tilt adjustment section is provided with: a sub guide shaft inner periphery fixing spring that has a hole through which an inner periphery side end of the sub guide shaft passes and that is fixed to the base chassis; a sub guide shaft outer periphery adjustment spring that has a hole through which an outer periphery side end of the sub guide shaft passes and that is fixed to the base chassis; and a sub guide shaft adjustment screw that is screwed into the base chassis and whose tip is in contact with the sub guide shaft outer periphery side end; wherein the sub guide shaft inner periphery fixing spring forces the disk inner periphery side end of the sub guide shaft toward the base chassis, and the sub guide shaft outer periphery adjustment spring forces the disk outer periphery side end of the sub guide shaft toward the sub guide shaft adjustment screw.

By means of this configuration, a disk apparatus of the present invention is able to prevent rattling of the sub guide shaft due to force being applied to the sub guide shaft. Also, with a disk apparatus of the present invention, the tip of the sub guide adjustment screw can be moved up or down by turning the sub guide adjustment screw, and the height of the end of the sub guide shaft at which force is applied to the tip of the sub guide adjustment screw can be adjusted. That is to say, with a disk apparatus of the present invention, the tilt of the sub guide shaft relative to the base chassis can be adjusted, enabling the guide shaft and the sub guide shaft to be securely kept parallel.

Furthermore, in a disk apparatus of the present invention, the turntable adjustment section has: a first adjustment section that is provided on a straight line passing through the rotating shaft of the spindle motor and parallel to the direction of movement of the optical pickup; and a second adjustment section and third adjustment section positioned so as to be mutually bilaterally symmetrical about the straight line; and the first through third adjustment sections have: a female screw shaft installed on the base chassis; a turntable adjustment screw that passes through a hole provided in a motor frame for fixing the spindle motor to the base chassis and is screwed into the female screw shaft; and a compression coil spring that is positioned between the motor frame and the base chassis, and is passed through by the female screw shaft and the turntable adjustment screw.

By means of this configuration, in each turntable adjustment section of a disk apparatus of the present invention, the motor frame and base chassis are forced in directions in which they are separated from each other by a compression coil spring. Consequently, in a disk apparatus of the present invention, rattling can be prevented. Also, in a disk apparatus of the present invention, since the motor frame position is regulated by the screw head of a turntable adjustment screw, the tilt and height of the motor frame relative to the base chassis—that is, the tilt and height of the spindle motor relative to the base chassis—can be adjusted by turning adjustment screws at three places.

Advantageous Effects of Invention

A disk apparatus of the present invention has an adjustment section that adjusts a radial angle, tangential angle, and height relative to a base chassis, on a motor frame of a spindle motor. Also, a disk apparatus of the present invention has an adjustment section that makes a guide shaft and sub guide shaft parallel. Therefore, in a disk apparatus of the present invention, adjustment of the distance between a disk and an optical pickup is made possible, at the same time as tilt adjustment is made possible, without any particular increase in parts precision. As a result, it can be made possible for a disk apparatus of the present invention to achieve stable disk playback performance and to perform stable focusing with no collisions between a disk and an object lens, without any particular increase in parts precision.

BRIEF DESCRIPTION OF DRAWINGS

FIG. 8 is a perspective view of a playback unit in a disk apparatus according to this embodiment;

FIG. 9 is a rear view of a tilt adjustment section in a disk apparatus according to this embodiment;

FIG. 10 is a drawing showing bottom views of a tilt adjustment section in a disk apparatus according to this embodiment;

FIG. 13 is a cross-sectional view of a screwing section of a turntable adjustment section in a disk apparatus according to this embodiment;

DESCRIPTION OF EMBODIMENTS

Figure 1:
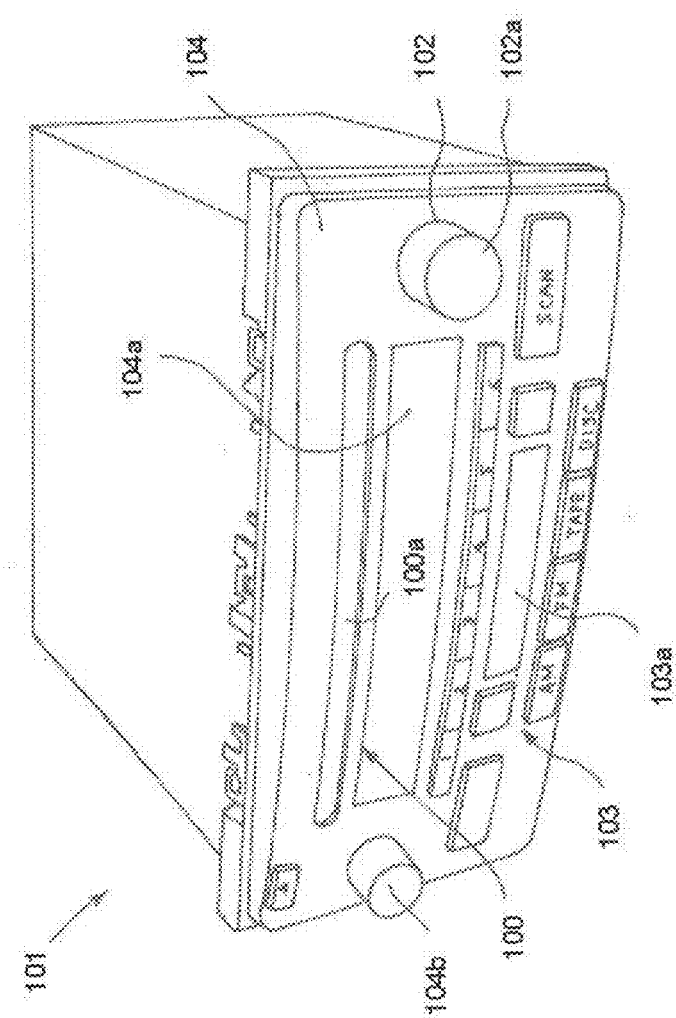
FIG. 1 is an overall perspective view of a car audio apparatus as an electronic apparatus incorporating a disk apparatus according to this embodiment.

Now, an embodiment of the present invention will be described with reference to the accompanying drawings. FIG. 1 is an overall perspective view of car audio apparatus 101 as an electronic apparatus incorporating disk apparatus 100 according to this embodiment.

This car audio apparatus 101 incorporates radio 102, cassette tape player 103, and so forth, in addition to disk apparatus 100. Front panel 104 of car audio apparatus 101 has display section 104a used for all functions, power/volume knob 104b, disk insertion/ejection aperture 100a for disk apparatus 100, radio tuning knob 102a, cassette tape insertion/ejection aperture 103a, and so forth. Inside, car audio apparatus 101 has a control section (not shown) that controls radio 102, cassette tape player 103, disk apparatus 100, and so forth.

Figure 2:
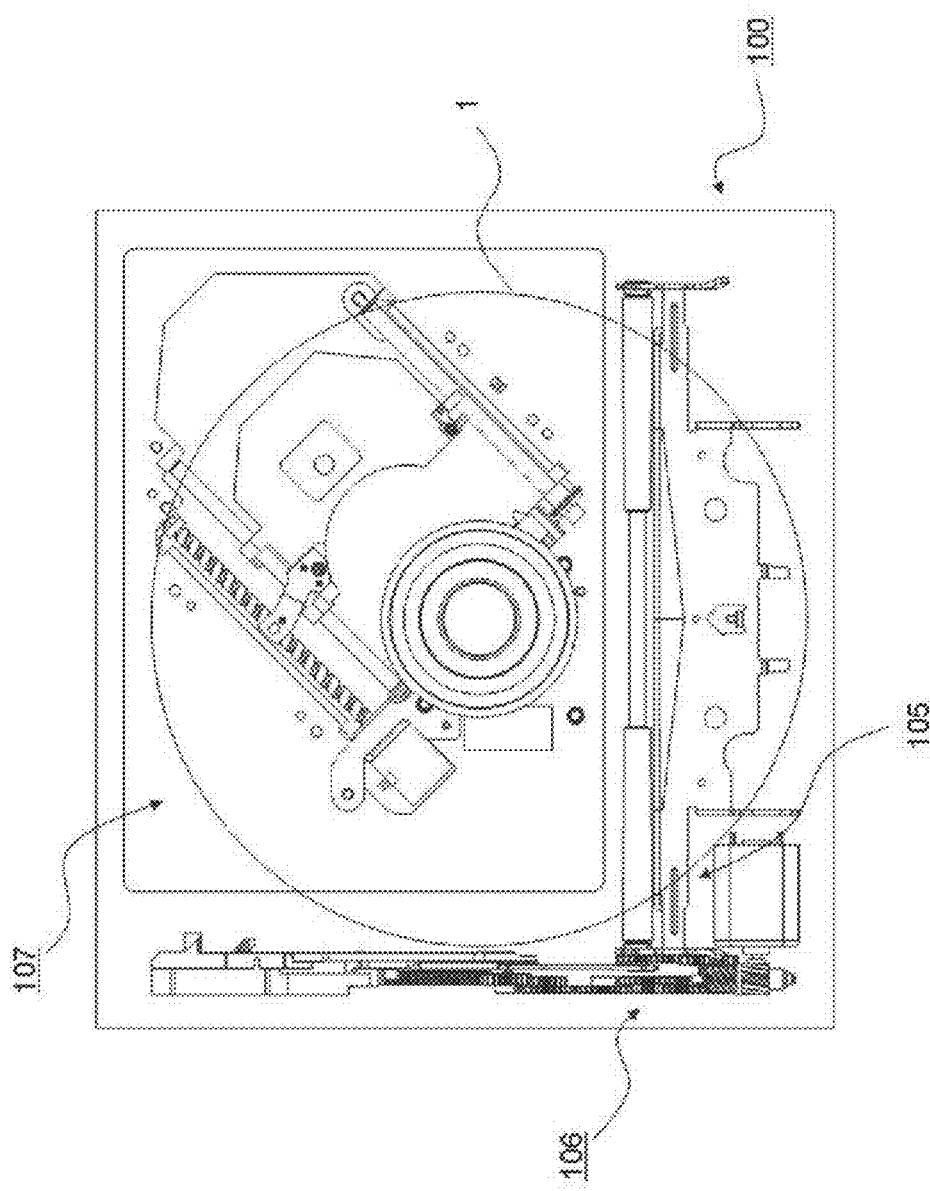
FIG. 2 is a front view of a disk apparatus according to this embodiment.

FIG. 2 is a front view of disk apparatus 100 according to this embodiment.

In the following description, of the directions perpendicular to the paper in FIG. 2, the direction toward the viewer is "up," and the direction away from the viewer (the depth direction) is "down."

In FIG. 2, disk apparatus 100 has roller unit 105, loading unit 106, and playback unit 107. Roller unit 105 transports disk 1 inserted from disk insertion/ejection aperture 100a into the interior of disk apparatus 100. Loading unit 106 rotates roller unit 105, and moves disk 1 to a clamping position. Playback unit 107 rotates disk 1 transported to the clamping position, and plays back a signal recorded on disk 1.

Figure 3:
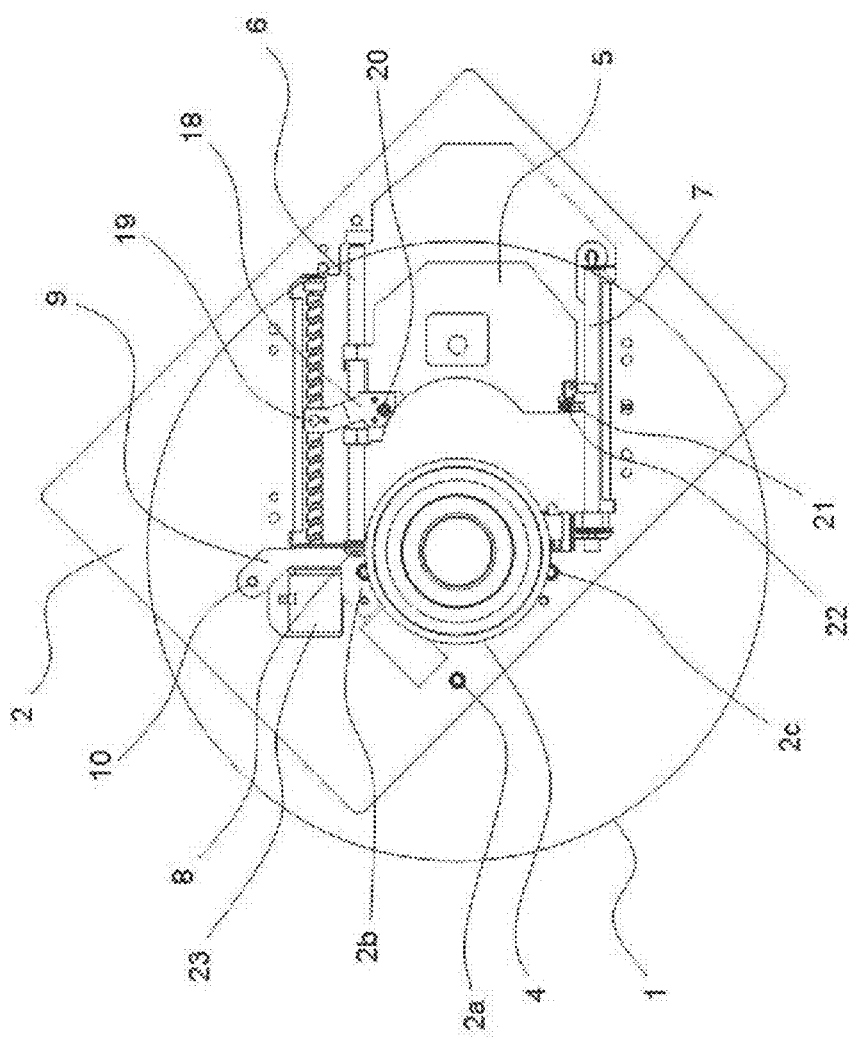
FIG. 3 is a front view of a playback unit in a disk apparatus according to this embodiment.
Figure 4:
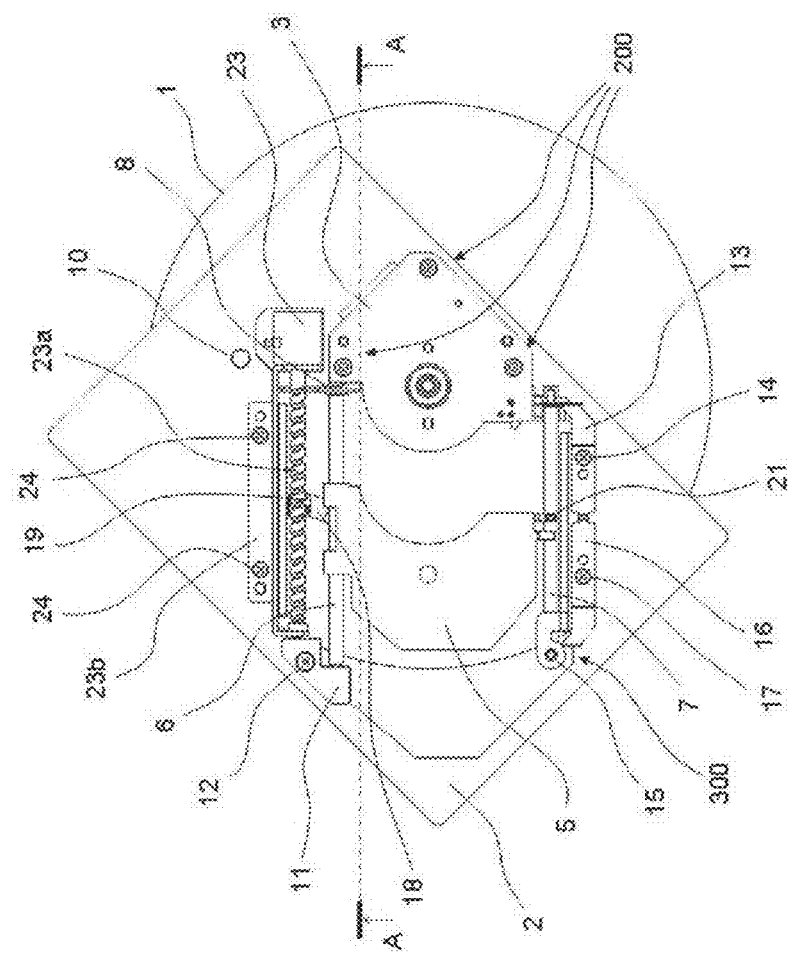
FIG. 4 is a rear view of a playback unit in a disk apparatus according to this embodiment.
Figure 5:
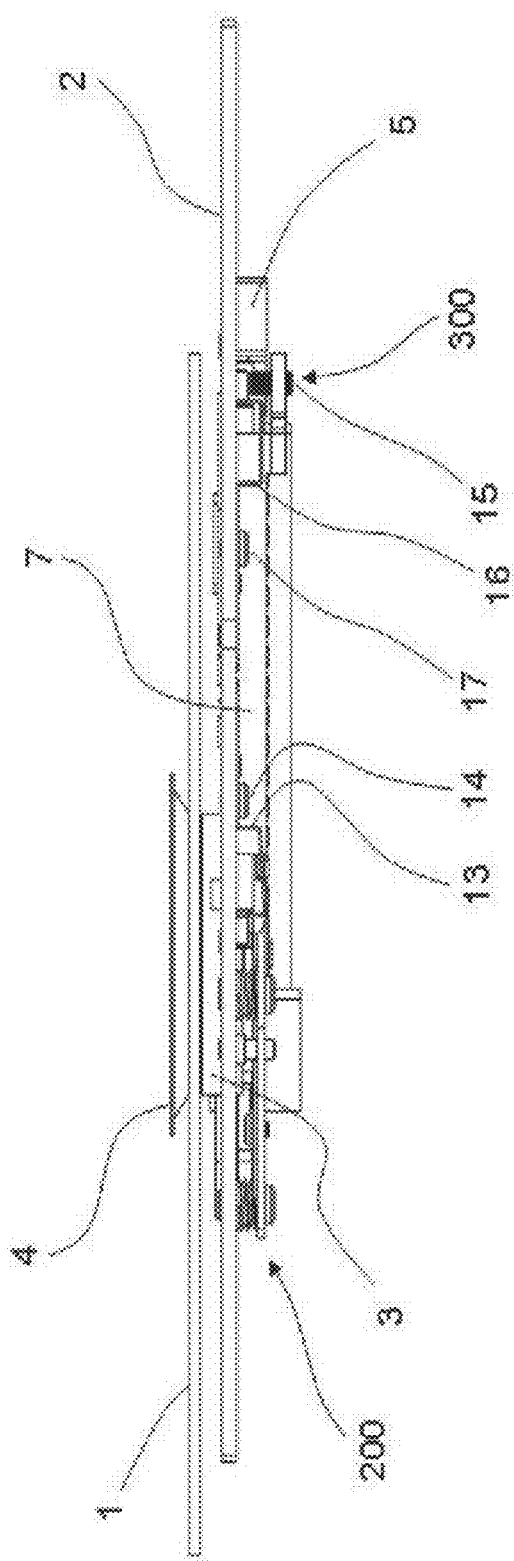
FIG. 5 is a bottom view of a playback unit in a disk apparatus according to this embodiment.
Figure 6:
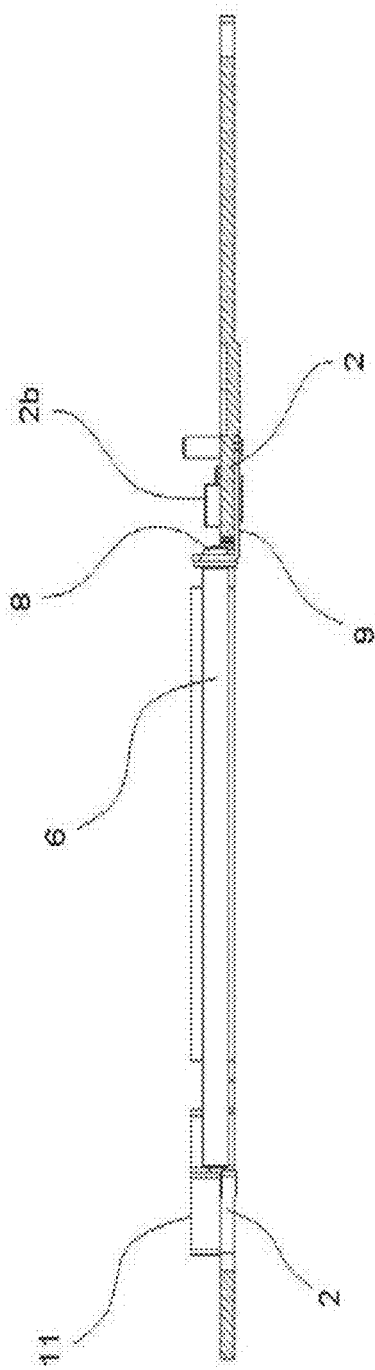
FIG. 6 is an A-A cross-sectional view of a rear view of a playback unit in a disk apparatus according to this embodiment.

FIG. 3 is a front view of playback unit 107 of disk apparatus 100 according to this embodiment, FIG. 4 is a rear view of playback unit 107 of disk apparatus 100 according to this embodiment, FIG. 5 is a bottom view of playback unit 107 of disk apparatus 100 according to this embodiment, and FIG. 6 is a cross-sectional view through A-A in FIG. 4 of disk apparatus 100 according to this embodiment.

As shown in FIG. 3 through FIG. 6, playback unit 107 of disk apparatus 100 is provided with base chassis 2 formed of hard resin, sheet iron, or the like. The parts of playback unit 107 are supported by base chassis 2.

Optical pickup 5 is a part for reading a signal recorded on disk 1. Optical pickup 5 is provided between two shafts, guide shaft 6 and sub guide shaft 7, that are parallel to each other, and is supported by these two shafts so as to be able to move in a direction parallel to the direction of extension of the shafts. That is to say, optical pickup 5 is provided with a tubular shape through which guide shaft 6 passes. By this means, it is possible for optical pickup 5 to move while being guided in the direction of extension of guide shaft 6.

There is also a similar relationship between sub guide shaft 7 and optical pickup 5. However, a U-shape is provided on the sub guide shaft 7 side instead of a tubular shape. By this means, movement of optical pickup 5 is also guided by sub guide shaft 7.

Turntable 33 is positioned so that the movement locus of optical pickup 5 is an arbitrary radius based on the center position of disk 1. Turntable 33 is a part for mounting disk 1.

Figure 7:
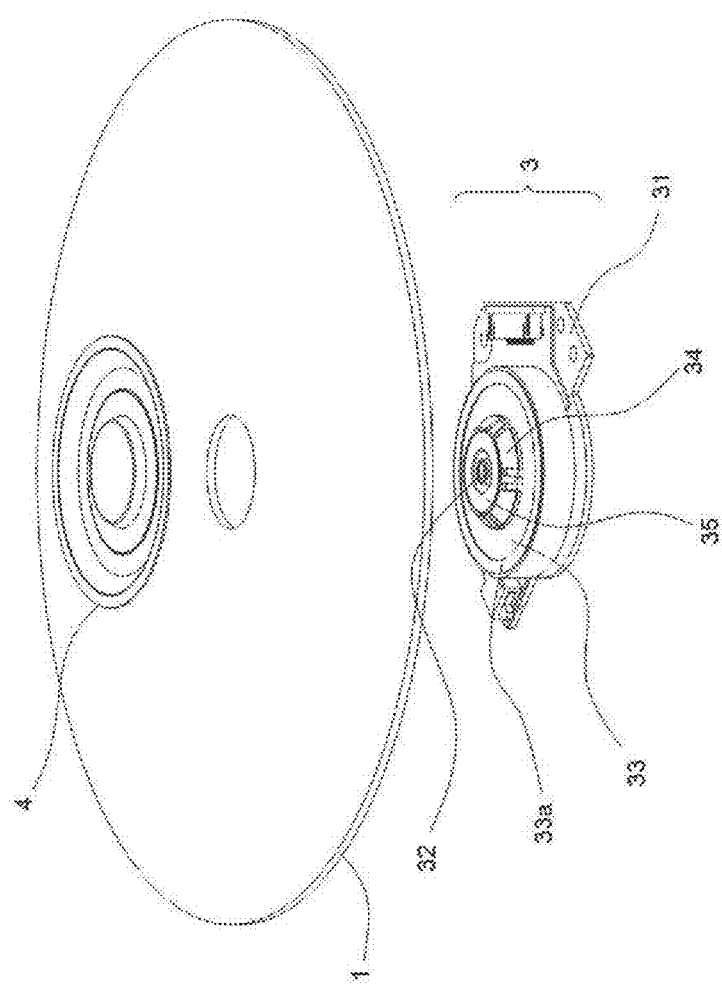
FIG. 7 is a configuration diagram of a spindle motor in a disk apparatus according to this embodiment.
Figure 11:
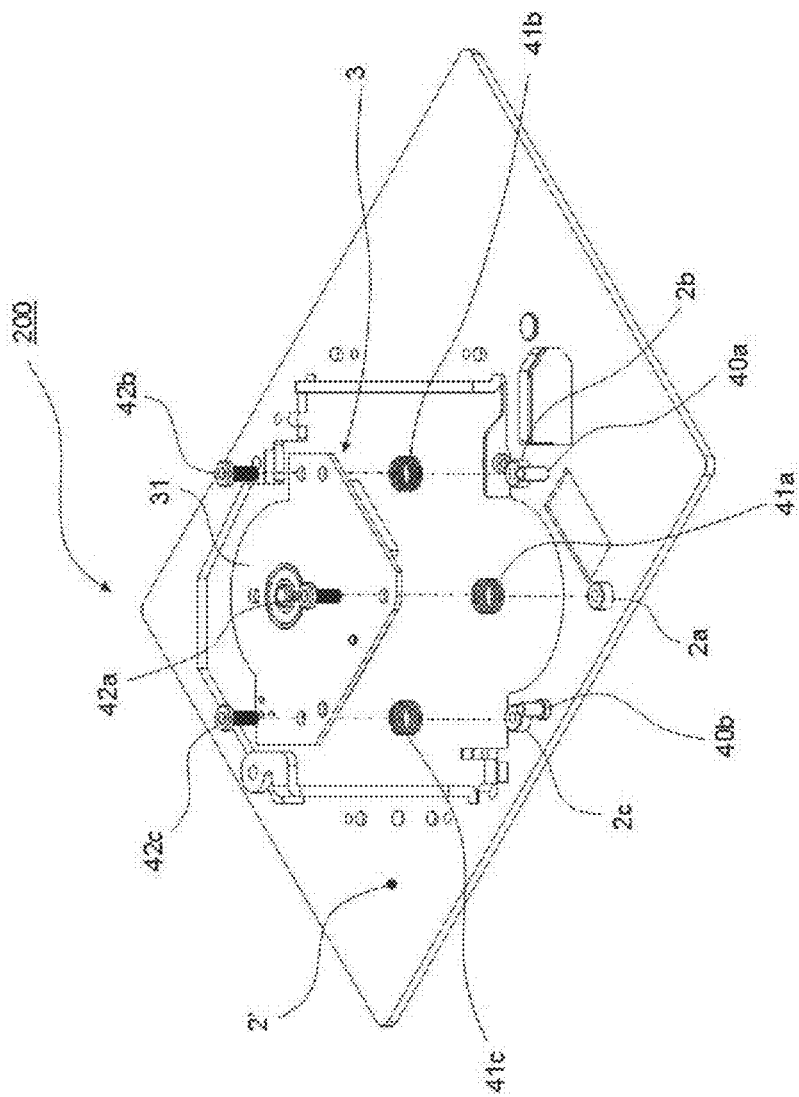
FIG. 11 is a perspective view of a turntable adjustment section in a disk apparatus according to this embodiment.

FIG. 7 is a perspective drawing showing the configuration of spindle motor 3 of disk apparatus 100 according to this embodiment.

As shown in FIG. 7, turntable 33 is provided as one part of spindle motor 3. Spindle motor 3 has motor frame 31, rotating shaft 32, turntable 33, alignment ring 34, and magnet 35.

Motor frame 31 supports all the parts of spindle motor 3. Rotating shaft 32 is provided in the center part of spindle motor 3. Turntable 33 is fixed to rotating shaft 32, and has rubber ring 33*a* on which spindle motor 1 is mounted affixed to it. Alignment ring 34 is fixed upon turntable 33, and performs axial alignment of disk 1. Magnet 35 is fixed to alignment ring 34.

Magnet 35 attracts clamper 4 provided above spindle motor 3. By means of this configuration, disk 1 mounted on turntable 33 is securely clamped between turntable 33 and clamper 4.

Guide shaft 6 is fixed to base chassis 2 in the following way. Below, a side corresponding to an outer periphery side of disk 1 when disk 1 is mounted on turntable 33 is referred to simply as "outer periphery side," and an end on the outer periphery side as "outer periphery side end." Also, a side corresponding to an inner periphery side of disk 1 when disk 1 is mounted on turntable 33 is referred to simply as "inner periphery side," and an end on the inner periphery side as "inner periphery side end."

Guide shaft outer periphery end bracket 11 is fixed to base chassis 2 by means of guide shaft outer periphery end bracket fixing screw 12. The outer periphery side end of guide shaft 6 is pressed against by this guide shaft outer periphery end bracket 11. Also, inner periphery cap 8 is installed in a position corresponding to the end on the opposite side of disk 1—that is, the disk 1 inner periphery side end when disk 1 is mounted on turntable 33. This inner periphery cap 8 is pressed into and fixed inside a hole in inner periphery bracket 9. Inner periphery bracket 9 is provided on base chassis 2 by means of swaged shaft 10.

Sub guide shaft outer periphery adjustment spring 16 and sub guide shaft inner periphery fixing spring 13 are fixing springs having a part with an L-shaped cross-section on which a surface that is fixed to base chassis 2 by means of a screw and a surface standing upright from this surface are provided. A hole through which an end of sub guide shaft 7 passes is provided in part of the respective upright surfaces of sub guide shaft outer periphery adjustment spring 16 and sub guide shaft inner periphery fixing spring 13. Sub guide shaft 7 is fixed to base chassis 2 using sub guide shaft outer periphery adjustment spring 16 and sub guide shaft inner periphery fixing spring 13.

That is to say, the outer periphery side end of sub guide shaft 7 is supported by passing through a hole provided in sub guide shaft outer periphery adjustment spring 16. Furthermore, with regard to sub guide shaft outer periphery adjustment spring 16, the above-mentioned surface connected to a surface having a hole is fixed to base chassis 2 by means of sub guide shaft outer periphery adjustment spring fixing screw 17.

Also, the inner periphery side end of sub guide of shaft 7 is supported by passing through a hole provided in sub guide shaft inner periphery fixing spring 13. Furthermore, with regard to sub guide shaft inner periphery fixing spring 13, the above-mentioned surface connected to a surface having a hole is fixed to base chassis 2 by means of sub guide shaft inner periphery fixing spring fixing screw 14.

Furthermore, sub guide shaft adjustment screw 15 is provided screwed into a thread groove of base chassis 2 so as to be able to come into contact with the outer periphery side end of sub guide shaft 7. Through rotation of sub guide shaft adjustment screw 15, the outer periphery side end of sub guide shaft 7 moves up or down.

On the guide shaft 6 side of optical pickup 5, nut piece hold-down spring 18 formed from an elastic member is installed by means of nut piece hold-down spring fixing screw 20. This nut piece hold-down spring 18 forces optical pickup 5 in a direction in which it comes into contact with guide shaft 6. By this means, vibration of optical pickup 5 can be suppressed even if disk apparatus 100 is affected by vibration or the like due to an external cause.

Also, on the sub guide shaft 7 side of optical pickup 5, sub guide shaft hold-down spring 21 formed from an elastic member is installed by means of sub guide shaft hold-down spring fixing screw 22. This sub guide shaft hold-down spring 21 forces optical pickup 5 in a direction in which it comes into contact with sub guide shaft 7. By this means, vibration of optical pickup 5 can be suppressed even if disk apparatus 100 is affected by vibration or the like due to an external cause.

Playback unit 107 has stepping motor 23, lead screw 23*a*, and bracket 23*b*, as parts for moving optical pickup 5. Lead screw 23*a* is the rotating shaft of stepping motor 23. Bracket 23*b* is a part for fixing stepping motor 23 to base chassis 2. Stepping motor 23 and lead screw 23*a* are positioned so that lead screw 23*a* is parallel to guide shaft 6 and sub guide shaft 7, and are installed on base chassis 2 by means of stepping motor fixing screws 24.

Nut piece 19 is installed by ultrasonic welding on above-mentioned nut piece hold-down spring 18 so as to fit into the groove of lead screw 23*a*. By this means, when lead screw 23*a* rotates due to the rotation of stepping motor 23, nut piece 19 fitted into the groove of lead screw 23*a* moves in the direction of extension of the axis of lead screw 23*a*. At this time, nut piece hold-down spring 18 and optical pickup 5 also move in the direction of extension of the axis of lead screw 23*a*—that is, in the radial direction of disk 1 when disk 1 is mounted on turntable 33—together with nut piece 19.

Next, various parameters including radial direction, tangential direction, and height direction, will be defined.

FIG. 8 is a perspective view of playback unit 107 of disk apparatus 100 according to this embodiment.

In FIG. 8, the radial direction is the direction of the normal to a signal track of disk 1 in the relationship between optical pickup 5 and the disk 1 signal surface (arrow A), the tangential direction is the direction of the tangent to a signal track of disk 1 in the relationship between optical pickup 5 and the disk 1 signal surface (arrow B), and residual tangential tilt is the difference in the optical pickup 5 tangential angle when optical pickup 5 is positioned on the inner periphery side and when optical pickup 5 is positioned on the outer periphery side.

Here, radial angle R is an angle created when a virtual straight line extending in the arrow A direction rotates with an axis extending in the arrow B direction as a rotation axis, tangential angle T is an angle created when a virtual straight line extending in the arrow B direction rotates with an axis extending in the arrow A direction as a rotation axis, and the height direction is the direction of the normal to the surface of disk 1 (arrow C).

The distance between disk 1 and optical pickup 5 is the distance from object lens 5a mounted on optical pickup 5 to the signal surface of disk 1. Object lens 5a is a lens that focuses a laser beam onto the signal surface of disk 1 in order to read a signal recorded on disk 1.

Next, a description will be given of the configuration of tilt adjustment section 300 that eliminates residual tangential tilt by making guide shaft 6 and sub guide shaft 7 parallel in playback unit 107 of disk apparatus 100 in this embodiment.

FIG. 9 is a rear view of tilt adjustment section 300, and FIG. 10 is a drawing showing bottom views of tilt adjustment section 300. Parts that are not necessary for the description, such as optical pickup 5, are omitted in FIG. 9.

In FIG. 9 and FIG. 10, tilt adjustment section 300 is configured by means of guide shaft 6, sub guide shaft 7, sub guide shaft inner periphery fixing spring 13, sub guide shaft outer periphery adjustment spring 16, and sub guide shaft adjustment screw 15 among the configuration components of playback unit 107 described above. As stated above, guide shaft 6 and sub guide shaft 7 are fixed on base chassis 2. Also, sub guide shaft inner periphery fixing spring 13 and sub guide shaft outer periphery adjustment spring 16 apply force to the inner periphery side end and outer periphery side end of sub guide shaft 7 respectively. Furthermore, sub guide shaft adjustment screw 15 is screwed into a thread groove provided in base chassis 2.

Here, the inner periphery side end of sub guide shaft 7 is forced by sub guide shaft inner periphery fixing spring 13 in a direction in which it presses against base chassis 2 (the D' direction). Furthermore, the outer periphery side end of sub guide shaft 7 is forced by sub guide shaft outer periphery adjustment spring 16 in a direction in which it presses against the tip of sub guide shaft adjustment screw 15 (the D direction).

Here, as shown in FIG. 10, the outer periphery side end of sub guide shaft 7 passes through a hole in sub guide shaft outer periphery adjustment spring 16, which is an elastic body, and is pressed against the tip of sub guide shaft adjustment screw 15. Consequently, as shown in FIG. 10B, by rotating sub guide shaft adjustment screw 15 to the left it is possible to move sub guide shaft adjustment screw 15 in the D direction, and thereby to move the outer periphery side end of sub guide shaft 7 in the D direction. Also, as shown in FIG. 10A, by rotating sub guide shaft adjustment screw 15 to the right it is possible to move sub guide shaft adjustment screw 15 in the D' direction, and thereby to move the outer periphery end of sub guide shaft 7 in the D' direction.

At this time, the inner periphery side end of sub guide shaft 7 is pressed against base chassis 2 by sub guide shaft inner periphery fixing spring 13 provided separated from sub guide shaft outer periphery adjustment spring 16. Consequently, the inner periphery side end of sub guide shaft 7 does not move in the D direction or in the D' direction influenced by rotation of sub guide shaft adjustment screw 15. Therefore, by rotating sub guide shaft adjustment screw 15, the outer periphery side end of sub guide shaft 7 pressed against the tip of sub guide shaft adjustment screw 15 is moved in the D or D' direction, and guide shaft 6 and sub guide shaft 7 can be made parallel.

Next, turntable adjustment section 200 will described using FIG. 11 through FIG. 16.

Turntable adjustment section 200 is provided with spindle motor 3 and three adjustment sections. These three adjustment sections attach spindle motor 3 to base chassis 2, and have a function of performing height adjustment and tilt adjustment of spindle motor 3 relative to base chassis 2.

Specifically, the first adjustment section has first turntable adjustment screw 42a, first female screw shaft 2a provided on base chassis 2 and screwed together with first turntable adjustment screw 42a, and first compression coil spring 41a interposed between these screws. The second adjustment section has second turntable adjustment screw 42b, second female screw shaft 2b provided on base chassis 2 and screwed together with second turntable adjustment screw 42b, and second compression coil spring 41b interposed between these screws. And the third adjustment section has third turntable adjustment screw 42c, third female screw shaft 2c provided on base chassis 2 and screwed together with third turntable adjustment screw 42c, and third compression coil spring 41c interposed between these screws.

Positioning of spindle motor 3 relative to base chassis 2 is implemented by passing first positioning shaft 40a and second positioning shaft 40b provided on base chassis 2 through a slotted hole and a hole respectively provided in motor frame 31 of spindle motor 3.

Furthermore, first female screw shaft 2a, second female screw shaft 2b, and third female screw shaft 2c are installed by swaging on base chassis 2. The diameter of each female screw shaft is smaller than the diameter of a corresponding spring among the corresponding compression coil springs. Also, the height of each female screw shaft is lower than the height in a normal state of a corresponding compression coil spring. Therefore, when spindle motor 3 is installed on base chassis 2, a state is established in which a corresponding female screw shaft passes through each compression coil spring. Then, when each turntable adjustment screw has been screwed into its corresponding female screw shaft in this state, each compression coil spring positioned between base chassis 2 and spindle motor 3 forces base chassis 2 and spindle motor 3 in directions in which the distance between them is increased.

As shown in FIG. 13, first compression coil spring 41a, second compression coil spring 41b, and third compression coil spring 41c are provided between motor frame 31 and base chassis 2. Therefore, motor frame 31 and base chassis 2 are forced in directions in which they are separated from each other by first compression coil spring 41a, second compression coil spring 41b, and third compression coil spring 41c. Then the gap between motor frame 31 and base chassis 2 due to the force of the compression coil springs is regulated by means of the screw head of first turntable adjustment screw 42a, the screw head of second turntable adjustment screw 42b, and the screw head of third turntable adjustment screw 42c.

Figure 12:
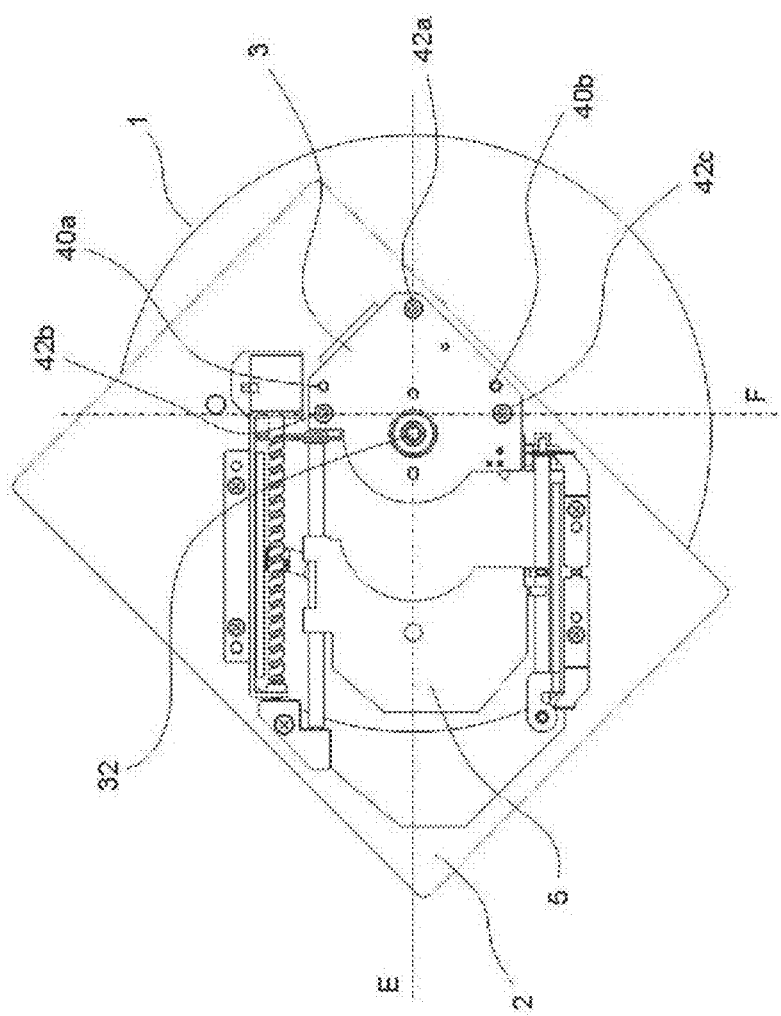
FIG. 12 is a rear view of a turntable adjustment section in a disk apparatus according to this embodiment.

Here, as shown in FIG. 12, first turntable adjustment screw 42a is positioned on straight line E passing through rotating shaft 32 of spindle motor 3 and parallel to the direction of movement of optical pickup 5. That is to say, first turntable adjustment screw 42a is a screw for adjusting the radial angle. Also, second turntable adjustment screw 42b and third turntable adjustment screw 42c are positioned on arbitrary straight line F orthogonal to straight line E so as to be mutually bilaterally symmetrical about straight line E. That is to say, second turntable adjustment screw 42b and third turntable adjustment screw 42c are screws for adjusting the tangential angle.

Adjustment of the radial angle of optical pickup 5 relative to disk 1 will now be described.

Figure 14A:
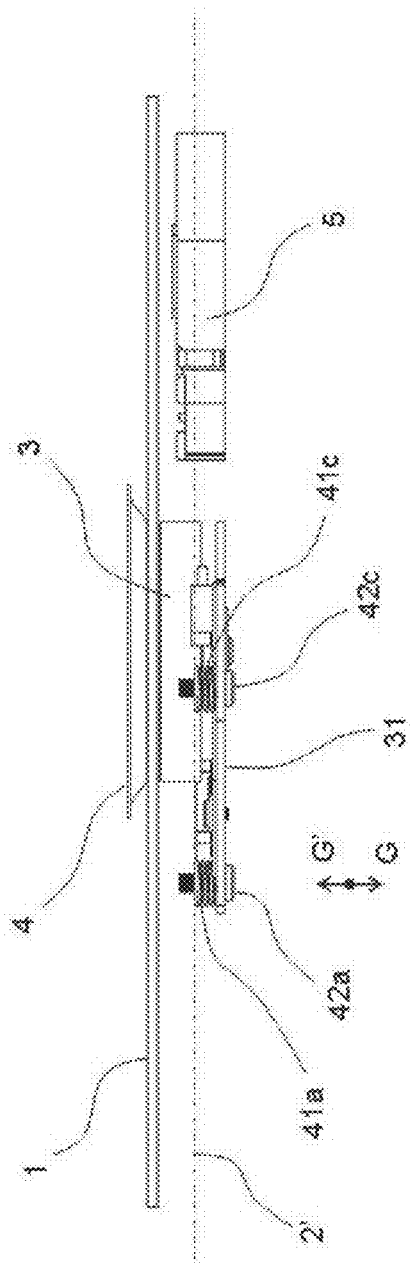
FIG. 14 is a drawing showing first bottom views of a turntable adjustment section in a disk apparatus according to this embodiment.
Figure 14B:
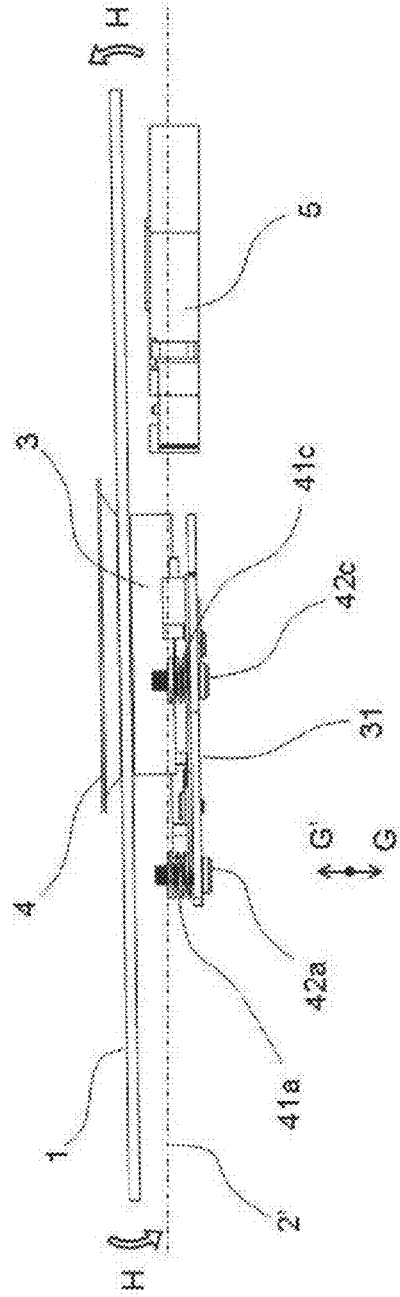

FIG. 14A is a bottom view of turntable adjustment section 200 in disk apparatus 100 according to this embodiment. FIG. 14B is a bottom view of turntable adjustment section 200 in disk apparatus 100 according to this embodiment when first turntable adjustment screw 42a of turntable adjustment section 200 has been rotated anticlockwise.

In FIG. 14A, when first turntable adjustment screw 42a screwed into first female screw shaft 2a is rotated to the left, first turntable adjustment screw 42a moves in the arrow G direction, which is a direction in which spindle motor 3 and base chassis 2 move apart from each other. Here, first compression coil spring 41a is interposed between motor frame 31 of spindle motor 3 and base chassis 2. Therefore, base chassis 2 and spindle motor 3 are forced in directions in which they are separated from each other. Furthermore, the gap between base chassis 2 and motor frame 31 due to this applied force is regulated by first turntable adjustment screw 42a. Consequently, the contact area between motor frame 31 and the screw head of first turntable adjustment screw 42a also moves in the G direction.

At this time, for example, second turntable adjustment screw 42b and third turntable adjustment screw 42c are not rotated. In this case, the position of the contact area between motor frame 31 and the screw head of second turntable adjustment screw 42b, and the position of the contact area between motor frame 31 and the screw head of third turntable adjustment screw 42c, do not change in the arrow G direction. Therefore, as shown in FIG. 14B, the angle of motor frame 31 relative to surface 2' of base chassis 2 changes in the arrow H direction. That is to say, the radial angle of optical pickup 5 relative to disk 1 changes. Similarly, when first turntable adjustment screw 42a is rotated to the right, the radial angle changes in the opposite direction to the arrow H direction.

Next, adjustment of the tangential angle of optical pickup 5 relative to disk 1 will be described.

Figures 15A, 15B:
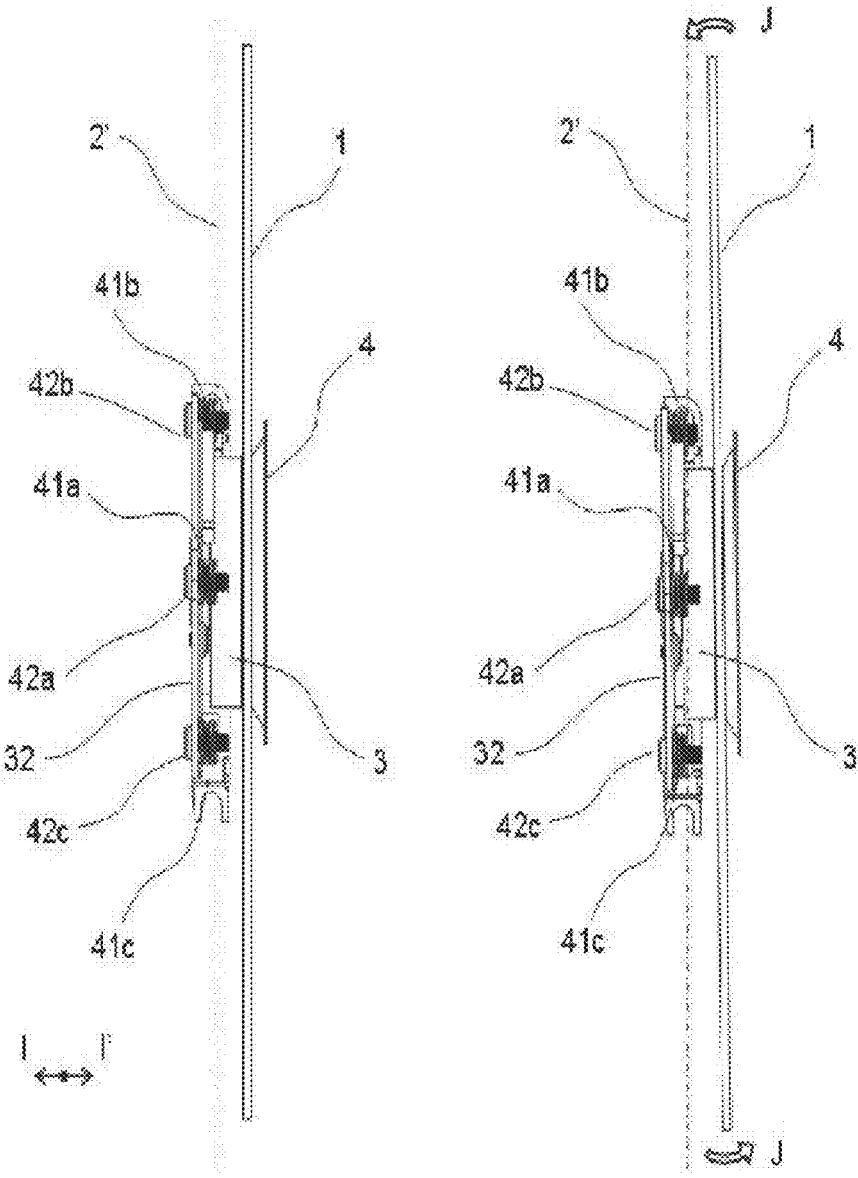
FIG. 15 is a drawing showing left side views of a turntable adjustment section in a disk apparatus according to this embodiment.

FIG. 15A is a left side view of turntable adjustment section 200 in disk apparatus 100 according to this embodiment. FIG. 15B is a left side view of turntable adjustment section 200 in disk apparatus 100 according to this embodiment when second turntable adjustment screw 42b of turntable adjustment section 200 has been rotated anticlockwise.

In FIG. 15, when second turntable adjustment screw 42b screwed into second female screw shaft 2b is rotated to the left, second turntable adjustment screw 42b moves in the I direction. Here, second compression coil spring 41b is interposed between motor frame 31 of spindle motor 3 and base chassis 2. Therefore, base chassis 2 and spindle motor 3 are forced in directions in which they are separated from each other. Furthermore, the gap between base chassis 2 and motor frame 31 due to this applied force is regulated by second turntable adjustment screw 42b. Consequently, the contact area between motor frame 31 and the screw head of second turntable adjustment screw 42b also moves in the I direction.

Also, when third turntable adjustment screw 42c screwed into third female screw shaft 2c is rotated to the right, third turntable adjustment screw 42c moves in the I' direction. Here, third compression coil spring 41c is interposed between motor frame 31 of spindle motor 3 and base chassis 2. Therefore, base chassis 2 and spindle motor 3 are forced in directions in which they are separated from each other. Furthermore, the gap between base chassis 2 and motor frame 31 due to this applied force is regulated by third turntable adjustment screw 42c. Consequently, the contact area between motor frame 31 and the screw head of third turntable adjustment screw 42c also moves in the I' direction.

As described above, second turntable adjustment screw 42b and third turntable adjustment screw 42c are positioned on arbitrary straight line F orthogonal to straight line E so as to be mutually bilaterally symmetrical about straight line E.

Here, a case in which the amount of rotation of second turntable adjustment screw 42b and the amount of rotation of third turntable adjustment screw 42c are the same is assumed. In this case, the amount of movement in the I direction of the contact area between motor frame 31 and the screw head of second turntable adjustment screw 42b, and the amount of movement in the I' direction of the contact area between motor frame 31 and the screw head of third turntable adjustment screw 42c, are the same. Therefore, in this case, the radial angle of rotating shaft 32 of spindle motor 3 does not change, while the angle of motor frame 31 relative to surface 2' of base chassis 2 changes in the arrow J direction (that is, the tangential direction). That is to say, it is possible to change the tangential angle without changing the radial angle of optical pickup 5 relative to disk 1.

Similarly, if second turntable adjustment screw 42b is rotated to the right and third turntable adjustment screw 42c is rotated to the left, the tangential angle can be changed in the opposite direction to the arrow J direction.

Also, there may be a case in which second turntable adjustment screw 42b and third turntable adjustment screw 42c are not mutually bilaterally symmetrical despite being positioned on arbitrary straight line F orthogonal to straight line E. In this case, the tangential angle can be changed without changing the radial angle by matching the ratio of the respective amounts of rotation to the ratio of distances from straight line E. That is to say, if, for example, the ratio of the distance from straight line E to second turntable adjustment screw 42b to the distance from straight line E to third turntable adjustment screw 42c is 1:2, the ratio of the amount of rotation of second turntable adjustment screw 42b to the amount of rotation of third turntable adjustment screw 42c should be made 2:1.

Adjustment of the distance between disk 1 and optical pickup 5 is as described below.

Figure 16A:
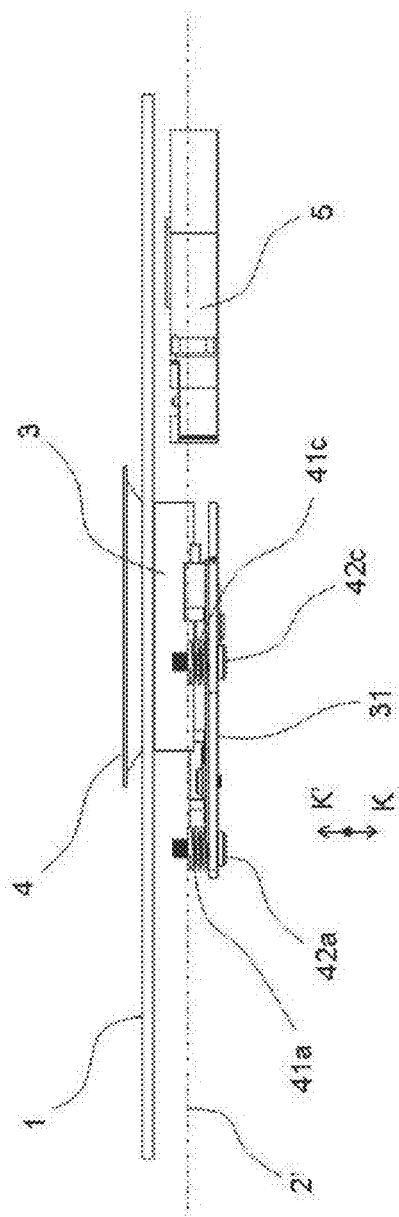
FIG. 16 is a drawing showing second bottom views of a turntable adjustment section in a disk apparatus according to this embodiment.
Figure 16B:
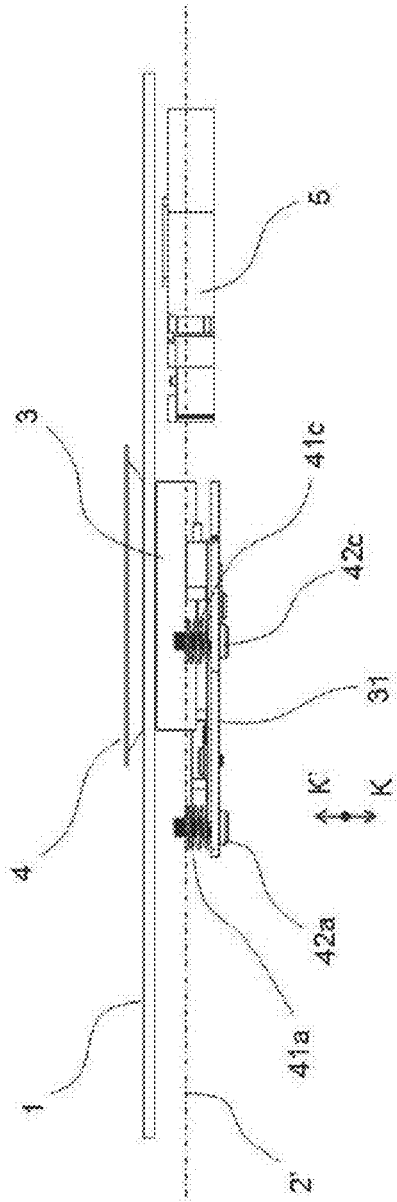

FIG. 16A is a bottom view of turntable adjustment section 200 in disk apparatus 100 according to this embodiment. FIG. 16B is a bottom view of turntable adjustment section 200 in disk apparatus 100 according to this embodiment when first through third turntable adjustment screws 42a through 42c of turntable adjustment section 200 have been rotated anticlockwise.

In FIG. 16, a case is assumed in which first turntable adjustment screw 42a, second turntable adjustment screw 42b, and third turntable adjustment screw 42c are rotated to the left by the same amount. In this case, the contact area between motor frame 31 and the screw head of first turntable adjustment screw 42a, the contact area between motor frame 31 and the screw head of second turntable adjustment screw 42b, and the contact area between motor frame 31 and the screw head of third turntable adjustment screw 42c, all move by the same amount in the K direction. That is to say, motor frame 31 moves in the K direction while maintaining its tilt relative to surface 2' of base chassis 2. Thus, the height of spindle motor 3 relative to surface 2' of base chassis 2 can be changed without changing the radial angle or tangential angle.

Also, if first turntable adjustment screw 42a, second turntable adjustment screw 42b, and third turntable adjustment screw 42c are rotated to the right by the same amount, the height of spindle motor 3 relative to surface 2' of base chassis 2 can be similarly changed in the K' direction.

Tilt adjustment and height adjustment in an embodiment configured in the above way will now be described.

Figure 17A:
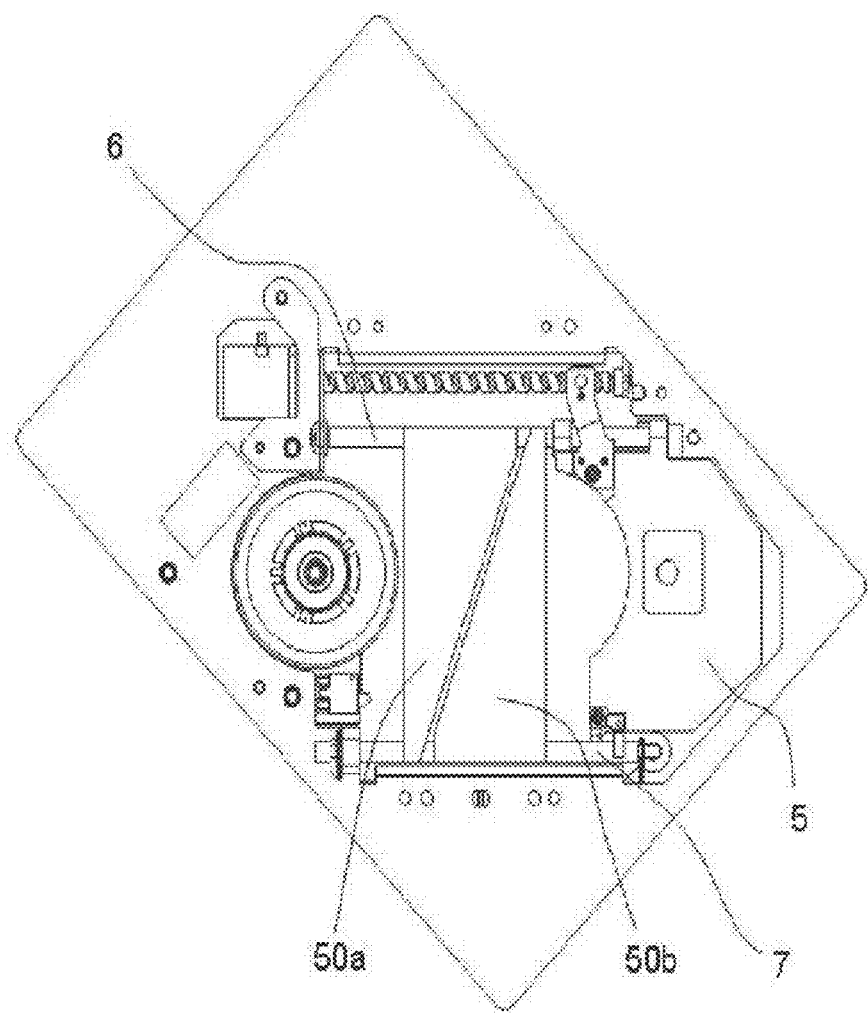
FIG. 17 is a drawing showing a first front view and a first bottom view when a first mirror and a second mirror are installed in a playback unit of a disk apparatus according to this embodiment.
Figure 17B:
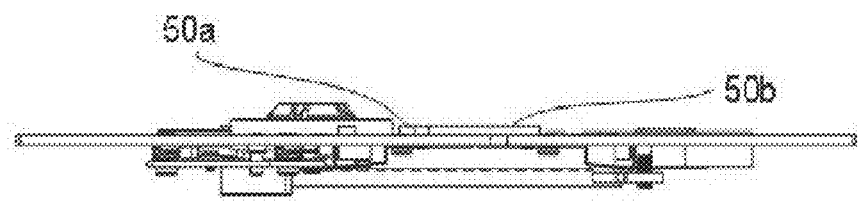

FIG. 17 is a drawing showing a front view and bottom view when using tilt adjustment section 300 in this embodiment. FIG. 17A shows a front view when a first mirror and a second mirror are installed in playback unit 107 of disk apparatus 100 according to this embodiment, and FIG. 17B shows a bottom view when a first mirror and a second mirror are installed in playback unit 107 of disk apparatus 100 according to this embodiment.

Figure 18A:
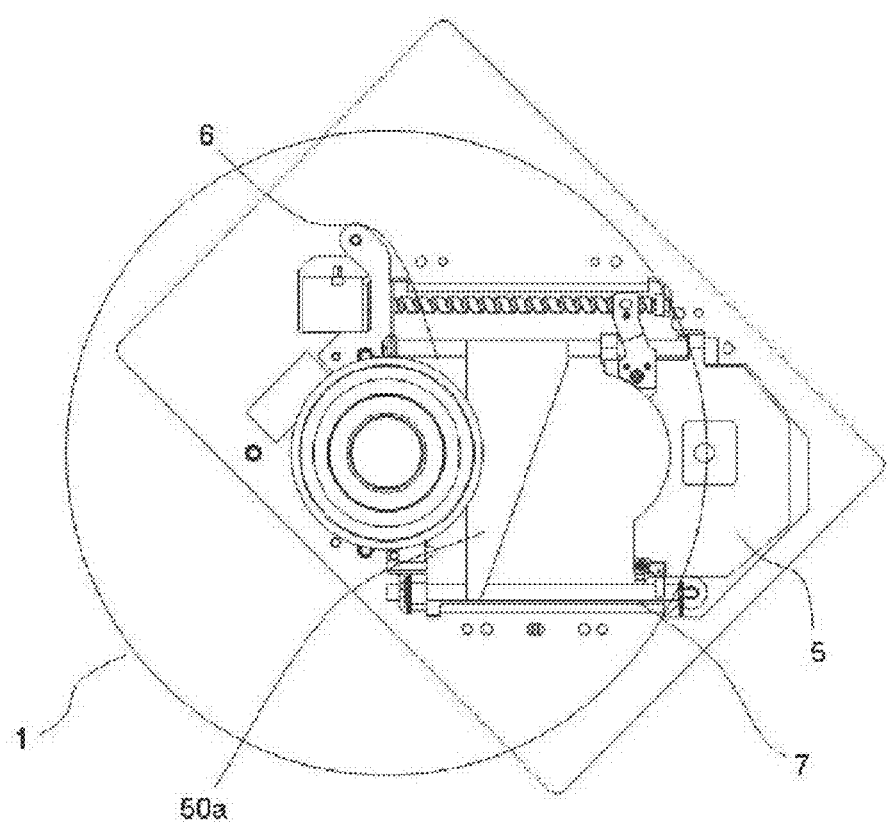
FIG. 18 is a drawing showing a second front view and a second bottom view when a first mirror and disk 1 are installed in a playback unit of a disk apparatus according to this embodiment.
Figure 18B:
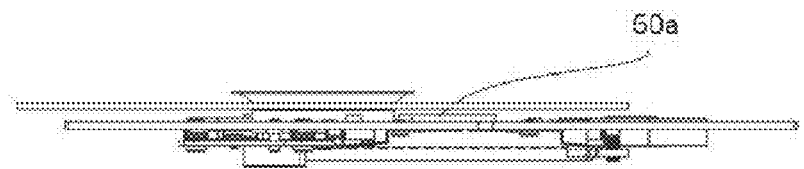

FIG. 18 is a drawing showing a front view and bottom view when using turntable adjustment section 200 in this embodiment. FIG. 18A shows a front view when a first mirror and disk 1 are installed in playback unit 107 of disk apparatus 100 according to this embodiment, and FIG. 18B shows a bottom view when a first mirror and disk 1 are installed in playback unit 107 of disk apparatus 100 according to this embodiment.

Optical pickup 5 is provided so as to be able to move in the radial direction of disk 1 between the inner periphery edge and outer periphery edge. First, in order to eliminate residual tangential tilt, sub guide shaft adjustment screw 15 of tilt adjustment section 300 is rotated and sub guide shaft 7 is made parallel to guide shaft 6, as described above.

Here, the method of confirming that guide shaft 6 and sub guide shaft 7 are parallel is as follows. Namely, first mirror 50a and second mirror 50b with trapezoidal upper surfaces are provided as shown in FIG. 17. First mirror 50a is mounted in such a way that, of the two sides corresponding to the upper base and lower base of the trapezoid, one side is in contact with guide shaft 6, and the other side is in contact with sub guide shaft 7. Also, further toward the outer periphery side than first mirror 50a, second mirror 50b is mounted in such a way that, of the two sides corresponding to the upper base and lower base of the trapezoid, one side is in contact with guide shaft 6, and the other side is in contact with sub guide shaft 7. Then a laser autocollimator is used to confirm the radial angle and tangential angle of first mirror 50a and second mirror 50b respectively.

First mirror 50a and second mirror 50b are made with an extremely high degree of parallelism of their mirror surfaces.

A laser autocollimator is a measuring instrument capable of precise angular measurement of optical parts, and is able to measure the tilt of an object to be measured. A laser autocollimator has a light emitting element, a collimator lens, a half-mirror, and a light receiving element.

A laser beam emitted from the light emitting element is changed to a parallel laser beam by the collimator lens, and is applied to an object to be measured. This parallel laser beam is reflected by the object to be measured. The reflected laser beam is focused by a light receiving lens, and forms an image on the light receiving element at the focal length of that lens. The image formation position at this time changes according to the angle formed by the emitted laser beam and the object to be measured. Consequently, when the tilt of the object to be measured changes, the image formation position on the light receiving element also changes. Therefore, the tilt of the object to be measured can be measured by angular conversion of the amount of change of this image formation position.

A laser autocollimator generally has a mode for measuring an object to be measured whose tilt changes dynamically, such as a rotating body—that is, a function for receiving a rotating body period setting and measuring average tilt of the object to be measured within one period.

When the radial angle and tangential angle are the same for first mirror 50a and second mirror 50b, first mirror 50a and second mirror 50b are parallel—that is, guide shaft 6 and sub guide shaft 7 are parallel. This adjustment is performed using above-described tilt adjustment section 300.

Next, adjustment of the radial angle and tangential angle, and also the height, of optical pickup 5 relative to disk 1 will be described.

First, the radial angle and tangential angle of optical pickup 5 relative to disk 1 are confirmed. Here, first mirror 50a (or second mirror 50b) and the laser autocollimator used to confirm the parallelism of guide shaft 6 and sub guide shaft 7 described above are utilized.

That is to say, first, the radial angle and tangential angle of first mirror 50a are measured using the laser autocollimator. Also, disk 1 is mounted on turntable 33, and the radial angle and tangential angle of disk 1 are confirmed using the laser autocollimator in a similar way. Then the radial angle and tangential angle of turntable 33 are adjusted using above-described turntable adjustment section 200 while performing confirmation of these disk 1 angles. That is to say, adjustment is performed so that the radial angle and tangential angle of first mirror 50a and the radial angle and tangential angle of disk 1 become the same.

A case will be considered in which the radial angle and tangential angle of first mirror 50a and the radial angle and tangential angle of disk 1 become the same. This happens when the radial angle and tangential angle relative to disk 1 become 0° for both guide shaft 6 and sub guide shaft 7. That is to say, this is when a state is established in which optical pickup 5 supported by guide shaft 6 and sub guide shaft 7 is positioned accurately relative to disk 1.

However, there may also be cases in which spindle motor 3 has a surface run-out component, or spindle motor 3 is not fixed absolutely perpendicularly to rotating shaft 32. In such cases, the radial angle and tangential angle of disk 1 when disk 1 is stationary are not constant, but differ according to the position of the rotation angle of turntable 33. Therefore, confirmation of the radial angle and tangential angle of disk 1 necessitates performing angle detection at a plurality of timings while rotating disk 1, and using an average of the detection results. This confirmation is possible, for example, by utilizing an above-described laser autocollimator capable of measuring an object to be measured such as a rotating body whose tilt changes dynamically.

Also, the distance between disk 1 and optical pickup 5 is confirmed using a laser displacement sensor. A laser displacement sensor is a measuring apparatus capable of measuring the distance to an object to be measured by means of a method in which triangulation is applied, and has a configuration combining a light emitting element and a light detecting element.

A laser beam emitted from the light emitting element of the laser displacement sensor is focused by a spotlight lens, and is applied to an object to be measured. Then some of the light rays that have undergone diffuse reflection from the object to be measured pass through a light receiving lens and form a spot on the light detecting element. Since the spot moves in correspondence with movement of the object to be measured, the distance to the object to be measured can be measured by detecting the position of that spot. Here, the distance to the object to be measured is the distance from the spotlight lens of the laser displacement sensor to the object to be measured.

A laser displacement sensor generally has a mode for measuring an object to be measured whose distance changes dynamically, such as a rotating body—that is, a function for receiving a rotating body period setting, and measuring an average distance within one period of the object to be measured.

First, the distance to first mirror 50a when first mirror 50a is mounted is measured using the laser displacement sensor. Next, disk 1 is mounted, and the distance to disk 1 is measured using the laser displacement sensor. At this time, the thickness of first mirror 50a and the thickness of disk 1 are fixed. Also, guide shaft 6 and sub guide shaft 7 hold first mirror 50a stationary. Therefore, the distances between the bottom surface of disk 1 and guide shaft 6 and sub guide shaft 7 respectively are found. Here, optical pickup 5 is configured with fixed dimensions set beforehand. Therefore, distances from the bottom surface of disk 1 to the contact points between guide shaft 6 and sub guide shaft 7 and optical pickup 5 (that is, the optical pickup 5 support sections) are also fixed dimensions set beforehand. Consequently, the distance between disk 1 and optical pickup 5 is accurately adjusted by adjusting the distances between the bottom surface of disk 1 and guide shaft 6 and sub guide shaft 7 to desired values using turntable adjustment section 200.

However, there may be a case in which spindle motor 3 is not fixed absolutely perpendicularly to rotating shaft 32 (and also a case in which spindle motor 3 has a surface run-out component), for example. In such cases, the distance to disk 1 when disk 1 is stationary is not constant, but differs according to the position of the rotation angle of turntable 33. Therefore, confirmation of the distance to disk 1 necessitates performing angle detection at a plurality of timings while rotating disk 1, and using an average of the detection results. This confirmation is possible, for example, by utilizing an above-described laser displacement sensor capable of measuring an object to be measured such as a rotating body whose distance changes dynamically.

With regard to height precision of turntable 33, there is a possibility of the distance between disk 1 and optical pickup 5 deviating from a design value. For example, if the distance between disk 1 and optical pickup 5 deviates greatly from the design value, object lens 5a of optical pickup 5 must be raised so as to be brought close to disk 1 during disk 1 playback. In this case, the range of movement of object lens 5a decreases in proportion as object lens 5a must be raised significantly in excess of an expected amount. This may lead to a fall in performance if disk 1 having surface run-out is played back, or if disk apparatus 100 is subjected to vibration, for example. Also, when focusing, it is difficult to perform stable focusing such that there is no collision between disk 1 and object lens 5a.

As a result of improved disk 1 recording density due to improvements in optical disk technology in recent years, as exemplified by BD (Blu-ray Disc) technology, higher precision has also come to be required with regard to the distance between disk 1 and optical pickup 5. As described above, according to disk apparatus 100 of the present invention, it is not necessary for the distance between disk 1 and optical pickup 5 to be brought as close as possible to a design value by pursuing greater flatness of base chassis 2 or precision of the height of turntable 33 of spindle motor 3 or the like (increasing parts precision), as with conventional apparatuses. Therefore, according to disk apparatus 100 of the present invention, the distance between disk 1 and optical pickup 5 can easily be set with a high degree of precision by adjusting turntable adjustment section 200.

In the above embodiment, a configuration has been described in which a sub guide shaft inner periphery fixing spring forces an inner periphery side end of a sub guide shaft toward a base chassis, and a sub guide shaft outer periphery adjustment spring forces an outer periphery side end of the sub guide shaft toward a sub guide shaft adjustment screw. However, as another embodiment of the present invention, a configuration may be employed in which a sub guide shaft inner periphery fixing spring is provided on the outer periphery side of the sub guide, a sub guide shaft outer periphery adjustment spring is provided on the inner periphery side of the sub guide, and a sub guide shaft adjustment screw adjusts the inner periphery side of the sub guide shaft.

That is to say, for example, a tilt adjustment section is provided with a sub guide shaft outer periphery fixing spring that has a hole through which an outer periphery side end of the sub guide shaft passes and that is fixed to a base chassis, a sub guide shaft inner periphery adjustment spring that has a hole through which an inner periphery side end of the sub guide shaft passes and that is fixed to the base chassis, and a sub guide shaft adjustment screw that is screwed into the base chassis and whose tip is in contact with the sub guide shaft inner periphery end. In the tilt adjustment section, the sub guide shaft outer periphery fixing spring forces the outer periphery side end of the sub guide shaft toward the base chassis, and the sub guide shaft inner periphery adjustment spring forces the inner periphery side end of the sub guide shaft toward the sub guide shaft adjustment screw.

The disclosure of Japanese Patent Application No. 2008-322151, filed on Dec. 18, 2008, including the specification, drawings and abstract, is incorporated herein by reference in its entirety.

Industrial Applicability

As described above, in addition to performing conventional tilt adjustment, a disk apparatus according to the present invention enables the distance between a disk and an optical pickup to be adjusted easily, and to be set with a high degree of precision. Therefore, a disk apparatus according to the present invention is suitable for use as a disk apparatus that enables stable disk playback performance to be achieved and enables stable focusing to be made possible with no collisions between a disk and an object lens, without any particular increase in parts precision.

REFERENCE SIGNS LIST

1 Disk
2 Base chassis
2' Base chassis surface
2a First female screw shaft
2b Second female screw shaft
2c Third female screw shaft
3 Spindle motor
4 Clamper
5 Optical pickup
5a Object lens
6 Guide shaft
7 Sub guide shaft
8 Inner periphery cap
9 Inner periphery bracket
10 Inner periphery bracket swaged shaft
11 Guide shaft outer periphery end bracket
12 Guide shaft outer periphery end bracket fixing screw
13 Sub guide shaft inner periphery fixing spring
14 Sub guide shaft inner periphery fixing spring fixing screw
15 Sub guide shaft adjustment screw
16 Sub guide shaft outer periphery adjustment spring
17 Sub guide shaft outer periphery adjustment spring fixing screw
18 Nut piece hold-down spring
19 Nut piece
20 Nut piece hold-down spring fixing screw
21 Sub guide shaft hold-down spring
22 Sub guide shaft hold-down spring fixing screw
23 Stepping motor
23a Lead screw
23b Bracket
24 Stepping motor fixing screw
31 Motor frame
32 Rotating shaft
33 Turntable
34 Alignment ring 35 Magnet
40a First positioning shaft
40b Second positioning shaft
41a First compression coil spring
41b Second compression coil spring
41c Third compression coil spring
42a First turntable adjustment screw
42b Second turntable adjustment screw
42c Third turntable adjustment screw
50a First mirror
50b Second mirror
100 Disk apparatus
101 Car audio apparatus
102 Radio
102a Radio tuning knob
103 Cassette tape player
103a Cassette tape insertion/ejection aperture
104 Front panel
104a Display section shared by all functions
104b Power/volume knob
200 Turntable adjustment section
300 Tilt adjustment section

The invention claimed is:

1. A disk apparatus comprising:
a turntable on which a disk is mounted;
a spindle motor that has a rotating shaft fixed to the turntable and that rotates the turntable;
an optical pickup that reads a signal recorded on the disk rotated by the spindle motor;
a drive motor that moves the optical pickup;
a base chassis on which the spindle motor is installed so as to be adjustable in position;
a guide shaft that is provided on the base chassis so as to extend in a radial direction of a disk mounted on the turntable, and that guides movement of the optical pickup by being in contact with part of the optical pickup;
a sub guide shaft that is provided on the base chassis and guides movement of the optical pickup;
a tilt adjustment section that adjusts a relative distance between the sub guide shaft and the base chassis; and
a turntable adjustment section that adjusts a radial angle, a tangential angle, and height of the spindle motor relative to the base chassis.

2. The disk apparatus according to claim 1, wherein:
the tilt adjustment section comprises:
a sub guide shaft inner periphery fixing spring that has a hole through which an inner periphery side end of the sub guide shaft passes and that is fixed to the base chassis;
a sub guide shaft outer periphery adjustment spring that has a hole through which an outer periphery side end of the sub guide shaft passes and that is fixed to the base chassis; and
a sub guide shaft adjustment screw that is screwed into the base chassis and whose tip is in contact with the sub guide shaft outer periphery side end; and
the sub guide shaft inner periphery fixing spring forces an inner periphery side end of the sub guide shaft toward the base chassis; and the sub guide shaft outer periphery adjustment spring forces an outer periphery side end of the sub guide shaft toward the sub guide shaft adjustment screw.

3. The disk apparatus according to claim 1, wherein:
the tilt adjustment section comprises:
a sub guide shaft outer periphery fixing spring that has a hole through which an outer periphery side end of the sub guide shaft passes and that is fixed to the base chassis;
a sub guide shaft inner periphery adjustment spring that has a hole through which an inner periphery side end of the sub guide shaft passes and that is fixed to the base chassis; and
a sub guide shaft adjustment screw that is screwed into the base chassis and whose tip is in contact with the sub guide shaft inner periphery side end; and
the sub guide shaft outer periphery fixing spring forces an outer periphery side end of the sub guide shaft toward the base chassis; and the sub guide shaft inner periphery adjustment spring forces an inner periphery side end of the sub guide shaft toward the sub guide shaft adjustment screw.

4. The disk apparatus according to claim 1, wherein:
the turntable adjustment section has:
a first adjustment section that is provided on a straight line passing through a rotating shaft of the spindle motor and parallel to a direction of movement of the optical pickup; and
a second adjustment section and third adjustment section positioned so as to be mutually bilaterally symmetrical about the straight line; and
the first through third adjustment sections have:
a female screw shaft installed on the base chassis;
a turntable adjustment screw that passes through a hole provided in a motor frame for fixing the spindle motor to the base chassis and is screwed into the female screw shaft; and
a compression coil spring that is positioned between the motor frame and the base chassis, and is passed through by the female screw shaft and the turntable adjustment screw.

* * * * *